3,409,546
METHOD FOR DEWATERING SEWAGE SLUDGE
WITH A MIXTURE OF POLYMERS
Stanley Mogelnicki, Midland, and Eugene M. Gatza, Bay City, Mich., assignors to The Dow Chemical Company, Midland, Mich., a corporation of Delaware
No Drawing. Filed June 1, 1966, Ser. No. 554,342
5 Claims. (Cl. 210—52)

The present invention concerns a novel composition and process for dewatering raw sewage sludges. It is well known that sewage sludges are most difficult to dewater due to the gelatinous nature of their solids. These sludges are usually essentially, non-free settling, with solids concentrations above about 1 percent of the system on a dry weight basis. The raw sewage sludges will often contain from about 5 to about 20 percent by weight solids. In effect, little or no densification of solids can occur under gravity without further mechanical and/or chemical conditioning of the suspension.

"Raw sewage sludge," as used herein, refers to sludges produced by the primary settling of sewage and sludge mixtures which contain at least about 50 percent by weight of such sludges. The remainder of such mixtures can be any one, or mixture, of digested and activated sewage sludges.

Conventionally raw sewage sludges, when suitably conditioned, are dewatered by any one of, or combination of several techniques involving filtration, compaction, flotation or centrifugation techniques. Generally, effective dewatering of the sludge means reducing the water content of the sludge below about 88 percent by weight water.

Within recent years, it has become common practice to utilize resinous, water-soluble, cationic organic polymers for conditioning the sludges for dewatering. In spite of the success of such polymers, there are still many waste treatment plants producing sludges which are relatively more economical to condition for dewatering with inorganic coagulants, such as ferric chloride or lime. As a consequence, the numerous advantages of using non-corrosive organic polymers are economically unavailable to such plants.

It would be desirable and it is an object of the present invention to provide an improved and more effective method for conditioning raw sewage sludges and similar aqueous suspensions of organic solids. A particular object and benefit of the invention is to provide a novel water-soluble, cationic resin composition useful for this purpose. These objects, and others, as will become apparent hereinafter, are accomplished in the present invention.

The present invention is based, at least in part, upon the discovery that a mixture of a water-soluble resinous amino-condensation polymer and a small amount of a high molecular weight, cationic vinyl-addition polymer, the two polymers being present in a limited range of relative proportions, is unexpectedly efficient, especially as applied from relatively concentrated applicating solutions, for conditioning raw sewage sludges for dewatering. For best results in the practice of the invention from about 0.02 to about 0.3 part of the cationic vinyl-addition polymer, preferably from about 0.1 to about 0.2 part thereof, are used in admixture with each part by weight of amine-condensation polymer.

The effectiveness of the above mixture is surprising in view of the fact that raw sewage sludges frequently cannot be effectively conditioned for dewatering with the use of the high molecular cationic polymers as the sole conditioning reagent applied as a 0.5 percent by weight aqueous solution. In such instances the high molecular weight addition polymers are believed to be so reactive with the sludge solids that it is effectively impossible to achieve uniform treatment of the sludge with them, without dispersing them and the sludge in large amounts of dilution water. For example, the polymer applicating solutions for successful employment of the high molecular weight polymers may contain as little as 0.005 percent polymer. To apply one pound of polymer from such a solution requires 20,000 pounds of water. After a point, the amount of dilution water necessary for effective usage of the high molecular weight polymers offsets many of the advantages of using polymer conditioning reagents.

In other words, the high affinity of the large polymer molecules for the sludge solids prevents achieving uniform distribution of the high molecular weight polymer throughout the suspension solids unless excessive dilution water is used. When used as a minor disperse phase in the presence of a relatively larger amount of an amino-condensation polymer, however, the lower molecular weight polymer apparently competes with the high molecular weight polymer for attractively charged sites and thereby prevents the larger, more reactive polymer from too quickly attaching to sludge solids. Thus, uniform distribution of the polymer throughout the aqueous suspension to be conditioned is achieved using a relatively concentrated applicating solution of the polymer.

Regardless of the theory of operability, and the present invention is in no way dependent thereon, the combination of the highly active, high molecular weight, cationic, vinyl-addition polymer with amino-condensation resins as prescribed above provides a surprisingly effective composition for conditioning raw sewage sludges for dewatering. The presence of a small amount of high molecular weight cationic addition polymer may reduce the total amount of amino-condensation polymer required to effectively condition the sludge for dewatering by as much as 50 to 75%.

Amino-condensation polymers useful in the present invention include the water-soluble polyalkylene polyamines which may be obtained as condensation polymers of ammonia and a halohydrin, ammonia and alkylene dihalides, alkylene dihalides and polyalkylene polyamines, halohydrins and polyalkylene polyamines. Preferably, lower polyalkylene polyamines are used in these reactions and as used herein this terminology refers to water-soluble alkylene diamines and polyalkylene polyamines wherein the alkylene group contains from 2 to 3 carbons.

Products somewhat comparable to polyalkylene polyamines, obtained according to the aforementioned condensation reactions, are polymers of alkylenimines. Low molecular weight forms of such polymers function comparably with the condensation polymers. By low molecular weight is meant a molecular weight of about 500,000 or less. Still further low molecular weight cationic resins are obtained as reaction products of amines and aldehydes such as melamine and formaldehyde or amides and formaldehyde such as urea formaldehyde resins. Other water-soluble condensation cationic resins are obtained as water-soluble reaction products of guanidine and formaldehyde.

Examples of the aforementioned water-soluble amino-condensation resins are described in numerous patents of which U.S. Patent 2,995,512 and U.S. Patent 3,131,144 are illustrative. Generally, the aminocondensation polymers are characterized by a large amount of chain branching and relatively low molecular weights as compared to the essentially linear cationic vinyl-addition polymers. They are frequently available only in the form of aqueous solutions.

The high molecular weight, cationic, vinyl-addition polymers employed in the invention are characterized by molecular weights greater than about 1 million. Correspondingly, 0.5 percent aqueous solutions of these polymers in water, at a pH of 7, are characterized, as a general rule, by viscosities greater than about 10 centipoises, as measured with an Ostwald viscosimeter at 25° C.

Exemplary of such cationic polymers are the homopolymers and water-soluble copolymers of N-vinylpyridine, ethylenically unsaturated mono, di, or trialkyl ammonium salts, such as vinylbenzyl trimethyl ammonium chloride, aminoethyl acrylate hydrochloride, N-methylamino ethyl acrylate, N,N-dimethylaminoethyl methacrylate, N,N-dimethylaminomethyl-N-acrylamide, N,N-dimethylamino-ethyl-N-acrylamide and the like. Preferred are polymers containing a plurality of aminoalkyl nitrogen-substituted acrylamide mers wherein the aminoalkyl substituent is hydrophilic, e.g., contains less than about 8 carbons.

Useful cationic, vinyl-addition polymers generally include the copolymers of U.S. Patent 3,104,896, ester copolymers of U.S. Patent 3,023,162, vinylbenzyl quaternary ammonium homopolymers and copolymers of U.S. Patent 3,055,827. The copolymers of half amides of U.S. Patent 2,157,595, novel quaternary compounds of U.S. Patent 3,170,901, and in general any of the polymers of U.S. Patent 3,171,805 of a sufficient molecular weight to be characterized herein as high molecular weight polymers.

To prepare the mixed polymer composition of the invention, it is possible to simply blend the low molecular weight amino-condensation cationic polymers and the high molecular weight addition polymers as particulate solids. When the low molecular weight aminocondensation polymers are available only in the form of aqueous solutions, the high molecular weight addition polymers, which are usually available in the form of particulate solids, are incorporated directly into the aqueous solution to provide a mixture with the desired ratio of high molecular weight to low molecular weight polymer. The aqueous solutions of amino-condensation polymers usually contain from about 10 up to as much as 50 percent, or more, by weight polymeric solids. Regardless of the physical form of the starting polymer compositions, enough of each is blended to produce a mixture having from about 0.02 to about 0.3 part by weight of the vinyl-addition polymer per part by weight amino-condensation polymer. This ratio will apply regardless of whether the mixed polymeric composition is prepared in the form of an aqueous solution or a blend of particulate solids.

Application of the polymeric blend to sludges to be dewatered is accomplished by first preparing an applicating solution of the polymeric blend which may contain from as little as about 0.01 percent by weight up to as much as 5 percent by weight dissolved polymeric solids. Since large amounts of dilution water are not required in the practice of the invention, the polymer applicating solution preferably contains from about 0.1 up to about 1.5 percent by weight dissolved polymer solids. The higher concentrations of polymer permitted in applicating solutions keep to a minimum the amount of dilution water required for a successful dewatering. The aqueous suspension of organic solids, i.e. sludge, is treated with a small amount of the polymer applicating solution to provide a predetermined, desired polymer dosage, based on the weight of suspended solids. Normally, suitable conditioning of the sludges is achieved with doses of from about 2 to about 6 pounds of the polymer admixture per ton of sludge solids treated.

With the application of the polymer solution, the sludge is simultaneously subjected to mild agitation. Such agitation is accomplished by any convenient means such as large slowly rotating paddles, effervescing gases, cascading streams and/or turbulent flow in conduits. The agitation is designed to provide homogeneous distribution of the applicating solution throughout the aqueous sludge.

After achieving suitable distribution of the application polymer solution throughout the sludge it is subjected to a dewatering operation which may involve one or more techniques such as compaction, filtration, flotation or centrifugation. The overall process carried out according to the present invention enables dewatering of the aqueous suspension with substantially reduced doses of amino-condensation polymers.

In a particular embodiment of the invention, a raw sewage sludge containing about 7.3 percent by weight solids was dewatered by filtration. The particular raw sewage sludge dewatered was a composite of sludge produced as a result of the primary settling of raw sewage to which was added a large proportion of aerobic trickling filter humous. The filtration operation was simulated in Buechner funnels on a laboratory scale.

The particular equipment used was a 12.5 centimeter Buechner funnel containing two layers of No. 1 Whatman filter paper. The funnel was seated in a vacuum flask to which was applied a standard vacuum.

Aliquots in the amount of 200 millimeters of the sewage sludge were treated with given amounts of a cationic polymer composition, in the form of a dilute aqueous solution, containing about 0.5 percent by weight polymer solids. The treated sludge was then agitated by pouring the sludge from container to container 8 times. The resulting conditioned sludge was then poured into the funnel and the vacuum applied. The volume of filtrate was measured at 10, 20, 30, 60 and 120 second intervals after application of the vacuum. After two minutes the vacuum was discontinued and the appearance of the filter cake qualitatively determined. The results of this experiment utilizing polymer mixtures of the invention as well as the polymers individually are reported below. The low molecular weight, cationic, amino-condensation resin used was a reaction product of a polyalkylene polyamine and ethylenedichloride, in the form of an aqueous solution, hereinafter termed polymer A. It was characterized by a viscosity in 37 percent by weight aqueous solution of about $2 \times 10^4$ centipoises at 25° C.

The high molecular weight vinyl-addition polymer used was a water-soluble homopolymer of acrylamide having a molecular weight of about 2 million, in which about 35 percent of the amide groups were substituted on the nitrogen atom with the dimethylaminomethyl moiety. This polymer is hereinafter termed Polymer B. A 0.5 percent by weight aqueous solution of this polymer was characterized by a viscosity of about 16 centipoises as measured with an Ostwald viscosimeter at 25° C.

TABLE I

| Run No. | Polymer Composition | Dose[1] (lbs./ton) | Filtrate Vol. (cc.) 10 secs. | 20 secs. | 30 secs. | 60 secs. | 120 secs. | Cake Quality | Residual Water (Percent) |
|---|---|---|---|---|---|---|---|---|---|
| 1 | Polymer B | 1.0 | 5 | 9 | 11 | 18 | 26 | None | 93 |
| 2 | do | 2.0 | 10 | 18 | 24 | 35 | 54 | do | 92 |
| 3 | do | 3.0 | 12 | 20 | 25 | 34 | 58 | do | 91 |
| 4 | do | 4.0 | 6 | 11 | 15 | 22 | 39 | do | 92 |
| 5 | do | 5.0 | 5 | --- | 10 | 20 | 32 | do | 93 |
| 6 | Polymer A | 5.6 | 45 | 68 | 86 | 118 | 144 | Wet | 83 |
| 7 | do | 7.4 | 60 | 91 | 112 | 142 | 159 | Moist | 79 |
| 8 | do | 9.3 | 65 | 104 | 126 | [2]151 | 162 | Dry | 78 |
| 9 | do | 11.1 | 88 | 124 | [2]142 | 156 | 160 | Dry | 79 |
| 10 | {Polymer B / Polymer A} | {0.25 / 4.34} | 48 | 69 | 88 | 125 | 151 | Moist | 81 |
| 11 | {Polymer B / Polymer A} | {0.5 / 4.25} | 58 | 84 | 105 | 138 | 158 | do | 79 |
| 12 | {Polymer B / Polymer A} | {0.75 / 4.17} | 70 | 100 | 118 | 148 | [2]162 | Dry | 78 |
| 13 | {Polymer B / Polymer A} | {1.0 / 4.07} | 54 | 74 | 90 | 120 | 143 | Wet | 83 |
| 14 | {Polymer B / Polymer A} | {1.5 / 3.88} | 25 | 40 | 51 | 75 | 106 | Very wet | 88 |

[1] The doses are the amounts of polymer per ton of sludge solids, on a dry basis.
[2] The vacuum broke.

From the above data, best conditioning of the sludge was achieved in Runs 8, 9 and 12. Considering these runs, it is evident that a dose of about 0.75 part by weight of the high molecular weight, vinyl-addition polymer in admixture with only 4.17 parts by weight of the condensation polymer was as effective as 9.3 parts by weight of the latter polymer used alone. The addition polymer was completely ineffective as applied from a 0.5 percent aqueous solution. It will be noted that as more of the high molecular weight polymer was added beyond a certain point, the dewatering rate decreased significantly due to over dosing.

In the manner similar to that of the foregoing, essentially comparable results are achieved by substituting for the substituted polyacrylamide, other cationic, water-soluble polymers, having molecular weights in excess of about 2 million, of vinylbenzyl ammonium chloride, aminoethyl acrylate, N,N-dimethylaminoethyl acrylate, N,N-dimethylaminoethyl-N-acrylamide and N-vinylpyridine. Similarly, other low molecular weight amino-condensation polymers, such as water-soluble reaction products of melamine and formaldehyde, polyalkylene polyamine and epichlorohydrin, ethylene dichloride and ammonia can be substituted for the aforedescribed polyalkylene polyamine condensation product to achieve comparable results.

What is claimed is:

1. A method for dewatering a raw sewage sludge which comprises mixing with the sludge an aqueous solution of a water-soluble, amino-condensation polymer and a high molecular weight, water-soluble, cationic, vinyl-addition polymer, the amount of vinyl-addition polymer present in the solution being from about 0.02 to about 0.3 part thereof for each part by weight of condensation polymer; the amount of aqueous polymer solution applied being sufficient to condition the sludge for dewatering and separating water from the conditioned sludge.

2. A method as in claim 1 wherein the raw sludge dewatered is not susceptible of conditioning for effective dewatering by the use of the high molecular weight, water-soluble, cationic, vinyl-addition polymer as the sole conditioning reagent applied as a 0.5 percent by weight aqueous solution.

3. A method as in claim 1 wherein the aminocondensation polymer is the water-soluble reaction product of a polyalkylene polyamine and ethylenedichloride and the vinyl-addition polymer is a water-soluble polymer containing a plurality of aminoalkyl-N-acrylamide mers wherein the aminoalkyl moiety is hydrophilic.

4. A method as in claim 1 wherein the aqueous polymer solution contains from about 0.1 to about 1.5 percent by weight polymer solids.

5. A method as in claim 4 wherein the amount of vinyl-addition polymer present in the solution is from about 0.1 to about 0.2 part thereof per part by weight of amine-condensation polymer.

References Cited

UNITED STATES PATENTS 3,023,162  2/1962  Fordyce et al.  210—54
3,252,900  5/1966  Kelman et al.  210—54

MICHAEL E. ROGERS, *Primary Examiner.*